(12) United States Patent
Palmer et al.

(10) Patent No.: US 12,015,723 B2
(45) Date of Patent: Jun. 18, 2024

(54) PHYSICALLY UNCLONABLE FUNCTION DEVICE

(71) Applicant: TTP Plc, Royston (GB)

(72) Inventors: Timothy John Palmer, Royston (GB); Michael Beck, Royston (GB)

(73) Assignee: TTP Plc, Royston (GB)

( * ) Notice: Subject to any disclaimer, the term of this patent is extended or adjusted under 35 U.S.C. 154(b) by 5 days.

(21) Appl. No.: 17/717,522

(22) Filed: Apr. 11, 2022

(65) Prior Publication Data

US 2022/0329444 A1 Oct. 13, 2022

(30) Foreign Application Priority Data

Apr. 12, 2021 (GB) ..................................... 2105157

(51) Int. Cl.
*H04L 9/32* (2006.01)
*G06F 21/75* (2013.01)
*H04L 9/08* (2006.01)

(52) U.S. Cl.
CPC ............ *H04L 9/3278* (2013.01); *G06F 21/75* (2013.01); *H04L 9/0816* (2013.01); *H04L 9/0866* (2013.01); *H04L 2209/12* (2013.01)

(58) Field of Classification Search
CPC ... H04L 9/3278; H04L 9/0816; H04L 9/0866; G06F 21/75
See application file for complete search history.

(56) References Cited

U.S. PATENT DOCUMENTS

| 10,256,983 | B1 | 4/2019 | Bauer et al. | |
| 2013/0280891 | A1* | 10/2013 | Kim | H01L 21/0262 |
| | | | | 438/478 |
| 2016/0359635 | A1* | 12/2016 | Kreft | G06Q 20/3825 |
| 2019/0325171 | A1* | 10/2019 | Obermaier | H04L 9/3278 |
| 2019/0334730 | A1* | 10/2019 | Endress | H04L 9/3247 |
| 2020/0051062 | A1 | 2/2020 | Wade et al. | |

(Continued)

FOREIGN PATENT DOCUMENTS

| WO | 2019116032 A1 | 6/2019 |
| WO | 2021007162 A1 | 1/2021 |

OTHER PUBLICATIONS

Great Britain Patent Application GB2105157.8 Combined Search Report and Examination Report dated Sep. 30, 2022.

(Continued)

*Primary Examiner* — Ellen Tran
(74) *Attorney, Agent, or Firm* — Erise IP, P.A.

(57) ABSTRACT

A physically unclonable function (PUF) device comprises a plurality of conductors, at least some of which are arranged so that they interact electrically and/or magnetically with one another. A media surrounds at least a portion of each of the conductors, and circuitry is configured for applying an electrical challenge signal to at least one of the conductors and for receiving an electrical output from at least one of the other conductors to generate an identifying response to the challenge signal that is unique to the device. The media comprises a plurality of interactive regions, the interactive regions having an electrical and/or magnetic response characteristic which is permanently altered in response to a predetermined environmental event, and the identifying response is altered with the response characteristic.

17 Claims, 2 Drawing Sheets

(56) References Cited

U.S. PATENT DOCUMENTS

2020/0089921 A1    3/2020   Karakoyunlu et al.
2020/0142128 A1*   5/2020   Baer .................... G02B 6/1225

OTHER PUBLICATIONS

Great Britain Patent Application GB2314227.6 Search Report issued Feb. 29, 2024.

Guin, Ujjwal et al., "Counterfeit Integrated Circuits: A Rising Threat in the Global Semiconductor Supply Chain," Proceedings of the IEEE, vol. 102, No. 8, pp. 1207-1228, Aug. 2014; https://ieeexplore.ieee.org/document/6856206.

* cited by examiner

PHYSICALLY UNCLONABLE FUNCTION DEVICE

RELATED APPLICATION

This application claims priority and benefit of Great Britain Patent Application GB 2105157.8, filed Apr. 12, 2021, the disclosure of which is incorporated herein by reference in its entirety.

TECHNICAL FIELD

The present invention relates to a Physically Unclonable Function (PUF) device that maps an input (challenge) to an output (response) that is well-defined but difficult to duplicate or reverse-engineer. The invention has applications within device security, authentication, counterfeit protection and tamper-proofing.

BACKGROUND

Cryptographic primitives used in encryption assume 3 key features: Secure Key Generation, Secure Key Storage and Secure Execution. Analysis has shown a distinct lack of randomness in commonly used public keys, whilst the contents of said keys can be read directly from non-volatile digital memory even with extensive countermeasures.

Current methods of generating and storing these keys in memory, in such a way that protects them from common types of attack, are both difficult and expensive. Physically unclonable functions (PUFs) offer new form-fitting, cost-effective ways through which these keys can be securely generated and protected from malicious actors. They were first proposed with a view to identify individual IC's by their manufacturing defects. PUFs work by generating a key that is unique to the device, based on some physical characteristic of the device itself. The key is generated and read out by challenging the PUF, measuring the response and then performing some form of computation.

As the key is generated by the physical characteristics and manufacturing defects of the device, it should be close to impossible to create a physical copy or accurately model the response of the system to simulate it in software. If some individual attempts to measure the response of the PUF when subject to a challenge, the response should change sufficiently to invalidate the PUF, and protect the secret contained within the PUF. The lack of interchangeability between the challenges and responses leads to the ideal of the Challenge-Response Pair (CRP)—each challenge maps directly to 1 response.

PUFs have many applications:

Remote Challenge-Response Authentication: A simple example of this is password authentication, where the challenge is the request and the response the correct password. In the case of a PUF, one or more CRPs would be collected from the device during a registration stage. The device can subsequently be checked for authenticity by issuing a challenge and getting the desired response in return. The correct responses are not stored within the PUF, but are generated as a function of its physical structure, so the PUF is inherently robust to invasive attacks (that may attempt to read stored secrets). Many challenge-response pairs could be registered, so that each pair would only need to be used once (a one-time password), meaning that the system would be robust against replay attacks. The system doesn't require continuous power, or time synchronisation, unlike other 1-time authentication systems.

Encryption Relationship Management: The response of the PUF to a given challenge could be used to form a private encryption key. Again, the key would not be stored within the PUF itself, rendering it robust to invasive attacks.

Encryption Key Storage: Consider a situation where an FPGA is used to perform a custom process, and utilises an encrypted stream requiring the physical storage of a private key. This private key may therefore be vulnerable to a physical attack. By generating the key each time it is required, thus not storing it in electronic memory, the key is no longer vulnerable to unauthorised read-out.

Object Authenticity Verification: In this use-case, the PUF may either be embedded within the object to be verified, with some sort of external readout mechanism. Alternatively, the PUF may entirely enclose the physical object to be protected, and the challenge-response mechanism may be used to either ensure that the enclosed physical object has not be tampered with, or even to provide the code to a physical unlocking mechanism, which requires a complete challenge-response pair to unlock. Any attempt to interfere with the enclosure should change the response of the PUF and then be obvious to the possessor of the correct challenge-response pair(s).

WO 2019/116032 A1 describes a PUF device which exploits electrical and magnetic interactions between numerous conductive paths and a heterogeneous media in which the conductive paths are embedded. A subset of the conductive paths are excited by a modulated signal of selectable amplitude, frequency and phase generating a challenge, and a response is detected on another subset of the conductive paths.

The ideal PUF cannot be copied or modelled, and is truly unclonable, such that a key generated or stored by the PUF cannot be illegitimately extracted/copied. Additionally, the generated response is reproducible, once variations in temperature and humidity are accounted for.

In order to better approximate the ideal behaviour of a PUF, it is desirable to provide countermeasures to impede extraction or copying of the key.

SUMMARY OF THE INVENTION

The present invention provides a PUF device which irreversibly alters its properties when the device is exposed to conditions which may indicate that an adversary is attempting to extract information other than by performing a call and response. For example, an adversary may expose the device to conditions outside its normal range of operation, in order to build a model of the device. By incorporating such countermeasures into the physical design of the PUF device, it is more difficult to model the device without access to the initial design data, and attempts to extract information from the PUF device will render the device inoperable.

More specifically, according to a first aspect, the present disclosure provides a physically unclonable function (PUF) device comprising: a plurality of conductors, at least some of which are arranged so that they interact electrically and/or magnetically with one another; a media surrounding at least a portion of each of the conductors; and circuitry for applying an electrical challenge signal to at least one of the conductors and for receiving an electrical output from at least one of the other conductors to generate an identifying response to the challenge signal that is unique to the device, wherein the media comprises a plurality of interactive regions, the interactive regions having an electrical and/or magnetic response characteristic which is permanently altered in response to a predetermined environmental event, and the identifying response is altered with the response characteristic.

In some embodiments, the electrical and/or magnetic response characteristic is substantially non-linear prior to the predetermined environmental event.

In some embodiments, the response characteristic comprises one or more of a conductivity, permittivity, permeability and magnetic moment of each of the interactive regions.

In some embodiments, the alteration of the response characteristic comprises a change in the response characteristic of one or more interactive regions, or a change in an arrangement of the interactive regions in the media.

In some embodiments, the interactive regions comprise interactive particles.

In some embodiments, the interactive particles comprise one or more of neodymium particles and ferromagnetic particles.

In some embodiments, the interactive particles are distributed substantially non-uniformly in the media.

In some embodiments, the predetermined environmental event comprises a temperature at a location in the media exceeding a threshold.

In some embodiments, the predetermined environmental event comprises a temperature at a location in the media exceeding a threshold for a predetermined time.

In some embodiments, the predetermined environmental event comprises irradiation exceeding a threshold at a location in the media.

In some embodiments, the media comprises a photochemically sensitive material.

In some embodiments, the media comprises a plurality of photosensitive regions, each comprising a photovoltaic cell bonded to a dielectric material, and the alteration of the response characteristic comprises a breakdown of the dielectric material.

In some embodiments, the dielectric material comprises titanium dioxide.

In some embodiments, the predetermined environmental event comprises a humidity at a location in or on the media exceeding a threshold.

In some embodiments, the device comprises a casing around the media, and the predetermined environmental event comprises a breach of the casing.

In some embodiments, the media comprises a perovskite-structured material.

In some embodiments, the media comprises a methylammonium lead halide.

According to a second aspect, the present disclosure provides a packaged, single-chip, component comprising a device according to the first aspect.

According to a third aspect, the present disclosure provides a multi-chip module, or system-in-package module comprising a device according to the first aspect.

According to a fourth aspect, the present disclosure provides a tamper-proof electronic sub-assembly comprising a device according to the first aspect.

BRIEF DESCRIPTION OF THE DRAWINGS

Examples of the present invention will now be described with reference to the accompanying drawings in which.

DETAILED DESCRIPTION

Figure 1:
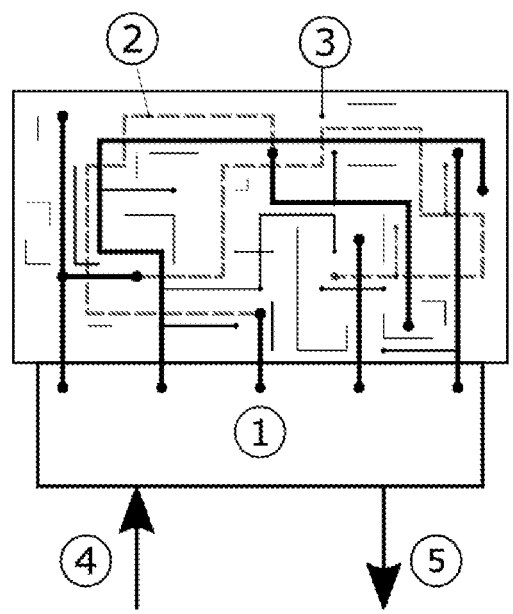
FIG. 1 is a schematic diagram of an example PUF device according to the invention.

FIG. 1 shows a simplified conceptual diagram of the PUF network, with a reduced number (e.g. five) of conducting paths 2 spread across two layers (solid black and dashed grey). The surrounding media 3 is, in this example, heterogeneous and is different for each PUF. The PUF interface circuitry 1 applies electrical stimuli to a subset of the conducting paths. The interface circuitry 1 or an external challenge input 4 determines the selection of paths; and amplitude, phase and frequency of the stimuli applied to these paths.

In any of the above described embodiments, the conducting paths may be arranged such that all paths have a good probability of interacting in the absence of the media 3. This arrangement of the conducting paths ensures that the response of the PUF instantiation is unpredictable. The arrangement of the paths may be calculated by an optimisation algorithm whereby the cost function is related to the deviation of the integrated path couplings. The path routing may also be changed between different instantiations of the PUF, provided the integrated coupling along the lengths of each path to all others is sufficient to provoke a complex, non-predictable, tamper-proof response.

The conducting paths may comprise electrically insulated wires overlapping one another; be embedded within a substrate material with vias to allow for overlapping routing; or be formed from a complex media of mixed permittivity, permeability and conductivity.

The currents induced, in response to the challenge, within a different subset of conducting paths are received by the circuitry 1 and provide an identifying response 5 which is output from the PUF. The output 5 will be application specific, derived from the behaviour of the PUF 2, 3 and inference by circuitry 1.

More specifically, in use the PUF is passed a challenge from an external circuit via the PUF Interface 1. The interface 1 converts the request, which could be received as a serial command, to a challenge which can be fed into the PUF device. For example, in an instantiation with ten conducting paths, four may be stimulated with a signal (of varying waveform shape, frequency, amplitude and phase offset), with the response measured on any number of the other six paths.

The presence of non-linear materials, such as ferromagnetics, within the heterogeneous media will introduce a dependency of the response to the amplitude of the challenge. Furthermore, eddy currents within the media will alter the response detected by an individual conductor and introduce a frequency dependence. The amplitude at the given stimulus frequency on each of the response wires is then converted into a response vector, which may then be converted back to a serial stream via the PUF interface 1 and fed back to the circuit.

The interface circuitry 1 between the PUF device and any application will be application specific. In a digital circuit, the challenge and response may be digital signals, that might be converted into analogue stimuli by the PUF interface. A serial example is provided here, but may also be implemented by a parallel bus or any other electrical interface circuitry. Alternatively, the challenge and response could themselves be analogue, in which case they may not need conversion before being transmitted to the conducting paths, and the interface 1 may simply comprise ends of the conducting paths 2.

The circuitry 1 for encoding challenges into the appropriate waveforms may be implemented as an Application Specific Integrated Circuit (ASIC), or by a combination of commercial off-the shelf components enclosed within the effective tamperproof region. This may also provide control access to the PUF, reducing the effectiveness of 'brute force' attacks by limiting the number of challenge-response pair requests within a given period.

The electrical and magnetic interactions between the conductors 2 are made more complex through the explicit introduction of heterogeneity in the surrounding media 3, for example through irregular distribution of some material through at least a part of the surrounding media. More specifically, according to the present invention, the media 3 comprises a plurality of interactive regions, the interactive regions having an electrical and/or magnetic response characteristic that affects the identifying response 5 for a given challenge input 4. Preferably, the response characteristic is non-linear, such that the response characteristic is very difficult to estimate based on sample inputs and outputs for the PUF device. An example would be to introduce localised regions of ferromagnetic particles (e.g. iron filings) or neodymium particles within the media, however the addition of any suitable conductive, dielectric, ferroelectric, magnetic or ferromagnetic material or localised doping of the media, or combinations thereof, will explicitly introduce heterogeneity into the surrounding media. Further complexity can arise from the use of non-linear and/or anisotropic materials thus distributed through the media. By observing characteristics of the PUF device, the response characteristic could be represented as a transmission matrix in terms of inputs and corresponding outputs for the conducting paths 2, or could be represented in three dimensions throughout the media 3. In many embodiments, the response characteristic is dependent upon the frequency(ies) of electrical stimuli applied to the conducting paths 2. The response characteristic may, for example, comprise any of a conductivity, a permittivity, a permeability and/or a magnetic moment of each of the interactive regions.

Environmental factors such as temperature may influence the response of the PUF. Factors such as humidity may be mitigated by instantiating the PUF within a hermetically sealed enclosure. Measurements of other parameters, for example by use of a thermocouple in the control ASIC, may then be used in the generation of a challenge to the PUF. Furthermore, the temperature of the PUF can be locally controlled as part of the challenge process, further increasing the difficulty of modelling the PUF device response.

However, while existing PUFs seek to minimise the effect of environmental factors, these environmental factors may also be used to detect an adversary attempting to probe the PUF device to measure the electrical characteristics of the instantiation. More specifically, as mentioned above, a representation of the PUF device, for example as a transmission matrix or a three-dimensional function, could be obtained by observing the PUF device. In order to inhibit this, the invention provides a media which is irreversibly altered in response to a predetermined environmental event. The irreversible alteration may affect the media as a whole, without affecting all of the interactive regions individually. Alternatively, each of the interactive regions may be individually irreversibly altered. By selecting the predetermined event to be an event which is plausibly associated with an adversary probing the PUF device, the PUF device can be rendered inoperable before it can be fully observed or copied. By incorporating such countermeasures into the physical design of the PUF device, the responses of the device will be difficult to detect without access to the initial design data, and attempts to measure the responses on a physical device will invoke these countermeasures, thus rendering the PUF inoperable.

Figure 2A:
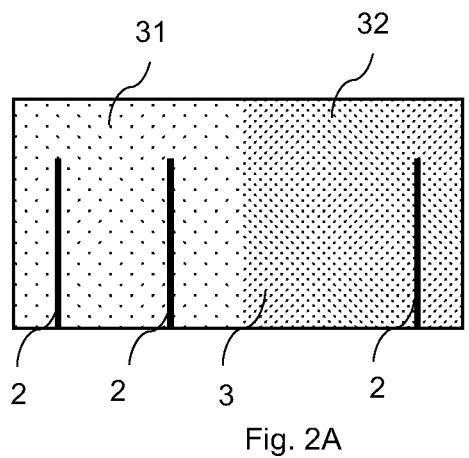
FIGS. 2A and 2B are schematic diagrams of media 3 in alternative PUF devices according to the invention.
Figure 2B:
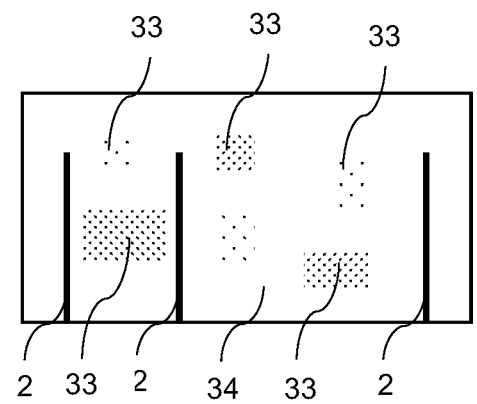

Examples of the media 3, surrounding conductors 2, are illustrated in FIGS. 2A and 2B. Each example may illustrate part of a larger PUF device with further media 3 not shown, or may represent the whole of a simple embodiment of the media 3.

Referring to FIG. 2A, in this example, the media 3 comprises interactive particles 11 (interactive regions) embedded in a bulk material. The bulk material may be electromagnetically inert, or may itself provide a background electromagnetic response characteristic that is combined with the response characteristic of the interactive regions. For example, the bulk material may be a setting material such as epoxy, or a substrate material such as FR4 that is doped with the interactive particles.

As shown in FIG. 2A, the interactive particles may be distributed substantially non-uniformly in the media 3. More specifically, as shown in FIG. 2A, a density of interactive particles may be varied in different regions of the media 3. In FIG. 2A, a left part 31 of the media 3 has a lower particle density than a right part 32 of the media 3. Such heterogeneity may, for example, be achieved by constructing the media 3 in stages, where each stage comprises a different part of the media 3 with a respective particle density, and the stages are assembled to form the complete media 3.

Referring to FIG. 2B, the media may additionally or alternatively comprise macroscopic interactive regions 33 embedded in the bulk material 34. In the example shown in FIG. 2B, each macroscopic region 33 itself comprises interactive particles. However, each macroscopic region 33 may alternatively be a homogeneous material such as a portion of metal or dielectric.

The macroscopic regions 33 may advantageously be large enough that they can be individually arranged at predetermined positions in the media 3. For example, the macroscopic regions 33 may be embedded in a setting material 34 as it sets. This means that, while the PUF device may be uncloneable for an adversary, the legitimate owner of the PUF device may contact the manufacturer to replace the PUF device without losing access to any data or other resources which are secured using the PUF device. For example, the predetermined positions may be pseudo-random, but selected by the manufacturer using a complex deterministic function of a serial number of the PUF device. In other embodiments, it may be preferable that even the manufacturer cannot replace the PUF device, in which case the use of a predetermined arrangement of interactive regions may be avoided.

The predetermined environmental event, in response to which the response characteristic is irreversibly altered, may be any of type of environmental effect. The predetermined environmental effect may be based on a limited range of "normal" environmental conditions. When the limits of "normal" environmental conditions are exceeded, the response characteristic is irreversibly altered. As with known PUF devices, the effects of the environment may nevertheless be minimized within the normal range of environmental conditions.

In a first example, the environmental event comprises a temperature at a location in the media being outside a normal operating range. For example, the PUF device may be configured to provide the identifying response 5 (with or without temperature dependency) in a normal operating range of 0° C. to 50° C. However, if the temperature at the location in the media is outside the normal operating range (i.e. exceeds a hot threshold or a cold threshold), the response characteristic is irreversibly altered, and the PUF device is no longer able to provide the expected identifying response 5. For these purposes, a temperature-type predetermined environmental event may be defined using two thresholds (hot and cold thresholds) or only one threshold (a hot threshold or a cold threshold. Furthermore, the normal operating range may be discontinuous. For example, a specific temperature range may be associated with the predetermined environmental event, and temperatures both higher and lower than this range may be "normal" temperatures which are not associated with the predetermined environmental event.

For temperature-type predetermined environmental events, a temperature threshold may be associated with particular physical or chemical characteristics of the media 3. For example, paramagnetic neodymium can be combined with ferromagnetic particles (e.g. iron filings) to provide one or more interactive regions with a fixed magnetic field in the media 3 under "normal" conditions. However, neodymium can be permanently demagnetised (i.e. its relative permeability falls to 1) when heated above 80° C. for a prolonged period. Without the field of the neodymium, the fixed field in the media 3 will change, and the remaining field of the ferromagnetic particles will gradually decrease. Under these changed magnetic conditions, the response characteristic of the media 3 is also changed, and the PUF device no longer gives correct identifying responses 5. It is noted that, in the specific example of demagnetised neodymium, the change is not irreversible in the sense that, given knowledge of the original magnetised configuration and a targeted magnetisation system, it would be possible to restore the original state of the media 3. However, for a PUF device, the key consideration is not whether this restoration/cloning is physically impossible, but rather whether it is sufficiently difficult under the security circumstances in which a PUF device is employed. An adversary would not have knowledge of the original magnetised configuration and thus, so far as the adversary is concerned, the alteration of the response characteristic is irreversible.

Furthermore, the predetermined environmental event may also comprise a speed of a temperature change, or a time for which the temperature exceeds a threshold. For example, when the media 3 is suddenly but briefly heated to a high temperature (e.g. >120° C.), the temperature change may not reach uniformly throughout the media, and may thus only affect a subset of the interactive regions in the media 3. Furthermore, different interactive regions may have different sizes or shapes, and may respond at different speeds to temperature changes. This position-dependent temperature distribution in turn may cause a position-dependent irreversible change in the response characteristic of the media 3. By detecting a position-dependent change, rather than a global change, in the media 3, the predetermined environmental event may be configured to dynamically allow for natural variation in environmental conditions, while detecting location-specific effects which are more likely to be associated with an adversary performing an intentional scan. In order to achieve this, one or more interactive regions and one or more conducting paths 2 may be used as a reference against which position-dependent changes in the response characteristic can be detected.

Rather than selecting materials with appropriate natural properties, temperature-type environmental effects may be more artificially built-in to the media 3. For example, the media 3 may contain a temperature sensor and control circuitry explicitly configured to disable the PUF device in response to a sensed temperature being outside the normal operating range. This may work in conjunction with natural properties of materials. For example, the control circuitry may trigger a supply of further heat to the PUF device to accelerate the effects of the external environmental event.

In a second example, the predetermined environmental effect comprises irradiation exceeding a threshold at a location in the media. While visible light would not reach deep into the media 3, and could not effectively be used by an adversary to determine properties of the PUF device, higher energy radiation (such as X-rays or gamma rays) could reach through the PUF device, and could be used to scan the PUF device unless this is prevented.

Irradiation-type environmental effects may be similar to temperature-type environmental effects, in the sense that a material is chosen which, when subjected to radiation of a particular frequency range (rather than a radiation spectrum associated with a temperature), may be irreversibly altered such that its electromagnetic response characteristic changes. For example, the media 3 may contain photochemically-sensitive materials (e.g. silver halides). In such cases, the permanent alteration of the response characteristic may comprise a change in resistance, e.g. as less-conductive silver halide is replaced with more-conductive atomic silver. A photosensitive material could, for example, be used as a fuse in series or parallel with one or more conducting paths 2.

Alternatively, irradiation-type environmental effects may be more explicitly built-in to the media 3, by using photovoltaic cells (e.g. particles of amorphous P-I-N silicon). These junctions may, for example, be tuned to respond to X-ray imaging. The diode junctions provide an electrical signal which can trigger the permanent alteration of the media 3. For example, the diode junction may be electrically connected across a dielectric material with a low breakdown voltage (e.g. titanium dioxide which has a breakdown field of 8 kV/mm), to form a circuit. When installed within the PUF device at manufacture, the circuit doesn't generate sufficient voltage to break down the dielectric. However, if the PUF device is x-rayed, the x-rays will penetrate into the PUF and illuminate the diode junction. The length of dielectric in the circuit may be arranged to be sufficiently small that the generated voltage exceeds the breakdown voltage of the dielectric, and the dielectric loses its electrical properties, permanently altering the response characteristic. Alternatively, as described above for temperature-type environmental effects, the response to the electrical signal may be more artificial. For example, a diode junction may be connected to control circuitry configured to trigger a permanent alteration of the response characteristic.

Figure 3:
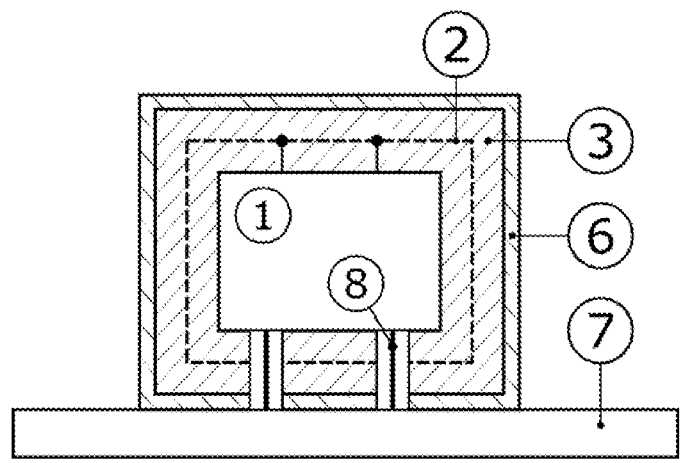
FIG. 3 is a schematic diagram of an example stand-alone PUF device according to the invention.

In one embodiment, the PUF device may be a self-contained, standalone element. This is shown in FIG. 3. In this arrangement, the PUF is protecting the relationship that maps challenges to responses, i.e. the control electronics 1 for the PUF. The control electronics 1 may also be connected to one or more environmental sensors (e.g. a temperature sensor or photovoltaic cell) and configured to trigger a permanent alteration of the response characteristic of the media 3 in response to a predetermined environmental event, as described above. The PUF interface 1 is contained within the PUF network (the conducting paths 2 in heterogeneous media 3). It is difficult to reproduce the precise arrangement and nature of the conducting paths within the heterogeneous media, making it difficult to clone the PUF. Containment 6 may be provided to surround the PUF, and provide physical protection/robustness. This can also include a metallic component/ground plane to inhibit electrical measurement of the PUF. This containment element is not essential to operation of the PUF device however.

The PUF device is shown mounted on a supporting structure 7, (such as a printed circuit board) for clarity, although this is not key to operation of the PUF, and is not essential.

Interconnects 8, pass through the heterogeneous media and containment to the circuit board to allow for communication between the PUF and the application circuit. Interconnects 8 may be omitted, or used only as a power supply, in a case where communication between the control electronics 1 and the supporting structure 7, via the conductors 2 and media 3, is used for the challenge and response.

Figure 4:
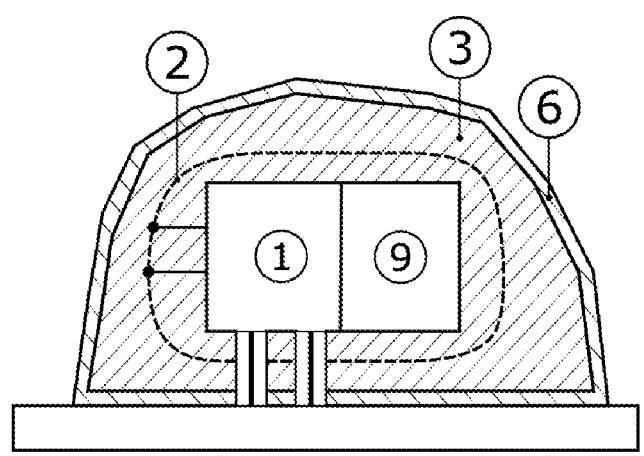
FIG. 4 a schematic diagram of an example PUF according to the invention which encases other components.

In another example, the PUF network may be used to fully/partially enclose other elements to provide protection to those elements, this is shown in FIG. 4. The PUF interface 1 and other protected components 9 are contained within the PUF network 2,3. For example, the protected components could be a microprocessor and encrypted storage module. In this case, the PUF can be used to generate the encryption key for the storage module. The PUF network has been formed around the interface electronics and protected components, and is connected to the interface internally. Attempts to disassemble or probe inside the PUF will cause a change in the electrical properties of the PUF network, leading to a change in the response generated for a given challenge, and preventing decryption of the storage module. Communication with the rest of the circuit can then be performed via the interconnects to the PCB.

In embodiments where the PUF device comprises shielding 6 around the media 3, the predetermined environmental event may comprise detection of a breach of or tampering with the shielding 6.

In one example, the shielding 6 may be a hermetic enclosure preventing hydrolysis or water seepage into the media 3. A breach of the shielding 6 may allow water in, causing humidity to exceed a threshold inside, or at a surface of, the media 3. In order to respond to the change in humidity, the media 3 may comprise a material which reacts with water.

More advantageously, the material may dissolve or experience structural breakdown when exposed to water, exposing more of the media to the humidity, for a cascading breakdown. By causing a breakdown of at least part of the media 3, a position of at least one of the interactive regions changes relative to the conductors 2, and the response characteristic of the media 3 changes leading to incorrect identifying responses when the PUF device is challenged (i.e. the PUF device becomes invalid for security purposes). This change of response characteristic occurs due to the rearrangement of the interactive regions of the media 3, even if the individual response characteristics of the interactive regions do not change. As an example of a water-reactive material that may experience structural breakdown, the media 3 may comprise a perovskite-structured material, such as a material in the lead- or tin-halide family of perovskites. More specifically, the material may be a methylammonium lead halide, or yet more specifically methylammonium lead iodide.

Perovskite-structured materials are dielectric and break down into non-dielectric components when exposed to water. Accordingly, in addition or alternative to the bulk material, the interactive regions of the media may comprise perovskite-structured materials. For example, the bulk material of the media 3 may be a water absorbing material such as a porous ceramic. In such cases, when humidity rises, water travels through the bulk material and reaches the interactive regions of perovskite. The perovskite then loses its dielectric properties and permanently alters the response characteristic of the media, without the above-described change to the physical structure of the media 3.

Perovskite-structured materials are also suitable for use as photovoltaic cells, in a perovskite solar cell, and undergo thermal decomposition when exposed to temperatures exceeding a threshold. As a result, perovskite-structured materials are a good candidate material for reacting to any of temperature-based, radiation based or humidity-based environmental events.

If shielding 6 is not included in an embodiment, the ambient humidity is less useful as a way of detecting an adversary attempting to investigate the PUF device. Nevertheless, water-reactive materials may be used for the permanent alteration of the response characteristic in response to detection of an adversary based on another environmental event. For example, the PUF device may comprise a stored vial of water, and the above-mentioned control circuitry may be configured to release the water onto or in the media 3 in response to the predetermined environmental event. In such embodiments, the released water reacts with the media 3 and causes breakdown of the media 3, altering the response characteristic and invalidating the PUF device.

In another example, tampering with a PUF device of any described embodiment may cause a mechanical shock in the media 3. To detect mechanical shock as a predetermined environmental event, the media 3 may, for example, comprise one or more interactive regions having a piezoelectric material used in conjunction with a dielectric having a low breakdown voltage, similarly to the photovoltaic cells described above. When the device experiences a mechanical shock, the piezoelectric material applies a voltage which breaks down the dielectric, irreversibly alters the response characteristic of the media 3, and invalidates the ability of the PUF device to give the correct response to a challenge.

In addition to improving security when a PUF device is in use for the above described known purposes of a PUF device, the techniques of the invention enable using a PUF device as a tamper detection mechanism, for detecting whether an associated object has been subjected to a predetermined environmental condition. The PUF device may, for example, be transported with or within an object that is not to be X-rayed. If the PUF device is no longer able to give a correct response to a challenge after transport, it may be deduced that the object has been X-rayed.

If the control electronics are embedded within the PUF, they should also include means to correct any errors to ensure a repeatable key is produced within the required response time. This may be fuzzy logic, such as a fuzzy extractor, that ensures that small changes in the physical response (e.g. noise) do not lead to changes in the response. Within the range of "normal" operation, environmental factors such as temperature are anticipated to have a well-known relationship to the measured response for a given challenge, and may be calibrated out by checking a fixed set of reference keys with known responses that were evaluated at registration.

In both FIGS. 3 and 4, the PUF element is shown as a dashed line to illustrate how it encloses the components to be protected. However, in a practical implementation the conducting paths 2 could extend to the edges of the heterogeneous media 3, with secondary conduction paths (due to the media and any additives) generally extending anywhere in the entire volume of the media.

The entire device may be fixed to a solid structure, or made flexible and shaped to the desired form factor for the initial registration process. The material and substrate selection may also be altered to adjust the entropy of the system, and to meet other constraints of the system such as thermal control. The device may then be also enclosed within a ground plane, forming a Faraday cage, as an initial measure to shield the unit from external electromagnetic interference and prevent side-channel attacks on the unit.

Between challenges, the number of paths involved in the challenge may change, as may the number of paths used to detect the response. The specific paths used within each challenge may be changed, or kept the same between different challenges. Similarly, the conductors 2 used to detect the response may also change between each challenge.

The frequencies of conductor excitation may be in the audio range, utilising low cost and readily available transmit/receive electronics, or may operate at higher frequencies to develop a more complex electromagnetic interaction in which time delays become significant, and at which physical effects such as the skin effect play a large role in the interaction between the conductors.

The initial registration process will be dependent on the use of the proposed invention, but is a necessary step to use the PUF device in a practical implementation. For remote authentication, the challenge-response pairs may be queried and stored securely during a registration process. For secure key storage, this is a one time and irreversible procedure.

PUF devices as described above may be encapsulated in a packaged single chip component that can be added to circuits. Alternatively, as shown in FIGS. 3 and 4, the PUF device may be mounted on a support such as a PCB. The PUF device may, for example, form part of a multi-chip module or a system-in-package module. Furthermore, the PUF device may be included with objects that are intended to be tamper proof, and in particular with tamper-proof electronic sub-assemblies.

The invention claimed is:

1. A physically unclonable function (PUF) device comprising:
a plurality of conductors, at least a portion of the plurality of conductors arranged such that the portion of the plurality of conductors interact electrically or magnetically with one another;
a media surrounding at least a portion of the portion of the plurality of conductors; and
circuitry for applying an electrical challenge signal to at least one conductor of the plurality of conductors and for receiving an electrical output from at least one other conductor from the plurality of conductors to generate an identifying response to the electrical challenge signal that is unique to the PUF device,
wherein the media comprises a plurality of interactive regions, the plurality of interactive regions having a response characteristic that is at least one of electrical or magnetic, wherein the response characteristic is permanently altered in response to a predetermined environmental event, and the identifying response is altered with the response characteristic,
wherein the predetermined environmental event comprises:
a temperature at a location in the media exceeding a threshold or a humidity at a location in or on the media exceeding a threshold, and
wherein the media comprises a perovskite-structured material.

2. The PUF device according to claim 1, wherein the response characteristic is substantially non-linear prior to the predetermined environmental event.

3. The PUF device according to claim 2, wherein the response characteristic comprises one or more of a conductivity, permittivity, permeability and magnetic moment of each of the plurality of interactive regions.

4. The PUF device according to claim 1, wherein alteration of the response characteristic comprises a change in the response characteristic of one or more interactive regions, or a change in an arrangement of the plurality of interactive regions in the media.

5. The PUF device according to claim 1, wherein the plurality of interactive regions comprise interactive particles.

6. The PUF according to claim 5, wherein the interactive particles comprise one or more of neodymium particles and ferromagnetic particles.

7. The PUF device according to claim 5, wherein the interactive particles are distributed substantially non-uniformly in the media.

8. The PUF device according to claim 1, wherein the predetermined environmental event further comprises irradiation exceeding a threshold at a location in the media.

9. The PUF device according to claim 8, wherein the media comprises a photochemically sensitive material.

10. The PUF device according to claim 8, wherein the media comprises a plurality of photosensitive regions, each comprising a photovoltaic cell bonded to a dielectric material, and alteration of the response characteristic comprises a breakdown of the dielectric material.

11. The PUF device according to claim 10, wherein the dielectric material comprises titanium dioxide.

12. The PUF device according to claim 1, wherein the predetermined environmental event comprises a humidity at a location in or on the media exceeding a threshold.

13. The PUF device according to claim 12, wherein the PUF device comprises a casing around the media, and the predetermined environmental event comprises a breach of the casing.

14. The PUF device according to claim 1, wherein the media comprises a methylammonium lead halide.

15. The PUF device according to claim 1, where the PUF device is configured for mounting in a tamper-proof electronic sub-assembly.

16. A packaged, single-chip, component comprising:
a substrate; and
at least one physically unclonable function (PUF) device associated with the substrate, the PUF device comprising:
a plurality of conductors, at least a portion of the plurality of conductors arranged such that the portion of the plurality of conductors interact electrically or magnetically with one another;
a media surrounding at least a portion of the portion of the plurality of conductors; and
circuitry for applying an electrical challenge signal to at least one conductor of the plurality of conductors and for receiving an electrical output from at least one other conductor of the plurality of conductors to generate an identifying response to the electrical challenge signal that is unique to the PUF device, wherein the media comprises a plurality of interactive regions, the plurality of interactive regions having a response characteristic that is at least one of electrical or magnetic, wherein the response characteristic is permanently altered in response to a predetermined environmental event, and the identifying response is altered with the response characteristic, wherein the predetermined environmental event comprises:
- a temperature at a location in the media exceeding a threshold or a humidity at a location in or on the media exceeding a threshold, and
- wherein the media comprises a perovskite-structured material.

17. A multi-chip module or system-in-package module comprising:
- at least one substrate; and
- at least one physically unclonable function (PUF) device associated with the substrate, the PUF device comprising:
  - a plurality of conductors, at least a portion of the plurality of conductors arranged such that the portion of the plurality of conductors interact electrically or magnetically with one another;
  - a media surrounding at least a portion of the portion of the plurality of conductors; and
  - circuitry for applying an electrical challenge signal to at least one conductor of the plurality of conductors and for receiving an electrical output from at least one other conductor of the plurality of conductors to generate an identifying response to the electrical challenge signal that is unique to the PUF device, wherein the media comprises a plurality of interactive regions, the plurality of interactive regions having a response characteristic that is at least one of electrical or magnetic, wherein the response characteristic is permanently altered in response to a predetermined environmental event, and the identifying response is altered with the response characteristic, wherein the predetermined environmental event comprises:
- a temperature at a location in the media exceeding a threshold or a humidity at a location in or on the media exceeding a threshold, and
- wherein the media comprises a perovskite-structured material.

* * * * *